Patented Mar. 20, 1934

1,951,564

UNITED STATES PATENT OFFICE 1,951,564

TANNING MATERIAL AND PROCESS FOR PREPARING

Ian C. Somerville and Harry R. Raterink, Philadelphia, Pa., assignors to Rohm & Haas Company, Philadelphia, Pa.

No Drawing. Application July 14, 1931, Serial No. 550,754

10 Claims. (Cl. 260—3)

This invention relates to tanning materials and particularly to the method of preparation and the use of a new tanning agent which produces very satisfactory and hitherto unattained results, especially in the making of white leather.

It has long been known that synthetic tanning materials may be prepared by condensing aromatic sulphonic acids by means of aldehydes. The colour of the leather produced by these materials is dependent to a large extent on the colour of the solution of condensed sulphonic acid. It has hitherto been found to be exceedingly difficult to manufacture a product of light enough colour to give consistently white leather.

Several methods have been suggested to control this aldehyde condensation such as the use of a carefully controlled range of temperature, adjustment of the concentration of acid, introduction of a metal such as zinc. By carrying out the reaction in presence of a large amount of urea or a derivative yielding urea a like result can be attained, though in this case the mechanism of reaction would appear to be different, since almost a molecular amount of urea relatively to aromatic nucleus is required.

We have now discovered that by the introduction of a small amount of a suitable substance prior to or during the aldehyde condensation, a surprising improvement in the colour of the condensed sulphonic acid is secured, resulting in a synthetic tanning material which produces very white leather. The substances which are most effective for this purpose are thiourea and substances capable of producing thiourea such as ammonium thiocyanate. The actual amount required depends on the nature of the sulphonic acid to be condensed.

With a simple aromatic nucleus such as phenol a remarkable improvement in the color may be observed with as low as .1 mole and the best possible effect is secured with less than .2 moles thiourea. Where the starting material is more complicated, for example 4.4'-dihydroxydiphenyl-dimethylmethane, a large amount of the controlling substance is required to produce an equal amount of lightening. In this particular case for instance double the amount of thiourea required for phenol sulphonic acid is necessary.

The substances suitable as starting materials in the preparation of the sulphonic acids are the simpler aromatic bodies, though in general it is preferable to use a hydroxy aromatic substance such as phenol or a phenol derivative. The sulphonation may be carried out by any of the standard methods using for example sulphuric acid, chlorosulphonic acid or oleum as the sulphonating agent. The nature of the finished product may be varied by changing the degree of sulphonation. The condensation is effected by means of the simpler aldehydes, formaldehyde being the most convenient though other aldehydes can be used. The amount of aldehyde chosen is the minimum amount which will give good condensation without formation of an appreciable amount of insoluble material.

At the end of the reaction the mixture is diluted, partially neutralized, and may be used directly in tanning by the methods ordinarily employed for synthetic tanning materials.

These products are also valuable in securing even colouring with acid or direct dyes, and act as mordants for basic dyestuffs.

The following examples illustrate the reactions which may be used to prepare synthetic tanning materials of this type, and show how they may be used in the preparation of white leather. It should be understood that the invention is not confined to these examples.

Example 1

Heat 94 g. of phenol in a flask with stirring to 40° C. Add 112 g. of sulphuric (66° Beaumé) slowly. Raise the temperature to 95-100° and hold there for two hours. Cool the solution, adding 70 g. of water, to 35° C. Add 15 g. thiourea and stir for ten minutes. Run in rather rapidly 63 g. of formaldehyde (38%), then raise the temperature to 80-85° C. for one hour. Cool the solution, add caustic soda to neutralize excess mineral acid, and dilute to desired strength. The solution may be used directly in tanning.

Example 2

Heat 94 g. phenol to 40° C. and add 153 g. sulphuric acid (66° Beaumé) slowly. Raise the temperature to 95-100° C. and hold there for two hours. Cool the solution somewhat, adding 70 g. of water, to 80° C. Add 15 g. thiourea, stirring until dissolved, then 35 g. acetaldehyde slowly. Hold the temperature at 80-85° C. for two hours. Cool, neutralize the excess of mineral acid and dilute to desired strength. The solution may be used directly in tanning.

Example 3

In a flask equipped with a stirrer mix 400 cc. of glacial acetic acid, 2 g. of zinc, and 228 g. 4-4'-dihydroxydiphenyl-dimethylmethane. Add 148 g. chlorsulphonic acid slowly, stir for one hour at 40° C. Then raise the temperature to 60° C. for two hours. Cool, adding 100 cc. of water, to 35° C. Add 15 g. thiourea, stirring until dissolved, then 41 g. formaldehyde (37%) rather rapidly. Heat to 80-85° C. for one hour. Remove the excess of acetic acid by steam distillation, then neutralize excess of mineral acid, and dilute with water to desired strength. The solution may be used directly in tanning.

*Example 4*

Heat 175 g. sulphuric acid (66° Beaumé) in a flask to 60° C. and add 228 g. 4-4'-dihydroxydiphenyldimethylmethane in the course of twenty minutes. Heat at 60° C. until the mixture is water soluble. Dilute with 100 cc. water and cool to 35° C. Add 30 g. of thiourea, stirring until dissolved, then 57 g. formaldehyde (37%) rather rapidly. Heat at 55-60° C. for one hour. Cool, add caustic soda to neutralize the excess mineral acids, and dilute with water to desired strength. The solution may be used directly in tanning.

*Example 5*

Heat 94 g. phenol to 40° C. and add 153 g. sulphuric acid (66° Beaumé) slowly. Raise the temperature to 95-100° C., and hold them for two hours. Add 70 g. water and cool below 30° C. Add 4 grams ammonium thiocyanate stirring until dissolved, then 24 grams of formaldehyde (38%) slowly, keeping the temperature below 30° C. Raise the temperature to 80° C. and hold there for 1 hour. Cool, dilute and neutralize excess mineral acid. The solution may be used directly in tanning.

It is to be understood that the above examples are merely illustrative of preferred embodiments of the invention and are not intended to confine the scope of the application in anyway since it is apparent to anyone versed in the art that variations can be made in method of operation, temperatures, proportions of ingredients, concentrations, etc., without departing from the spirit of the invention. The scope of the invention is to be restricted only in accordance with the claims which follow. No form of the invention is claimed to the exclusion of any other form.

The following claims are intended to cover the process whenever carried out in the presence of thiourea whether it is added as such or whether it is obtained in the reaction from substances capable of yielding it. It is understood that in the following claims the term "thiourea" covers substances capable of yielding thiourea.

What we claim is:

1. A composition of matter prepared by condensing a hydroxy aromatic sulphonic acid with an aldehyde in presence of thiourea.

2. A composition of matter prepared by condensing a hydroxy aromatic sulphonic acid with an aliphatic aldehyde in presence of thiourea.

3. A composition of matter prepared by condensing a material from the class consisting of the sulphonic acids of a phenol with an aliphatic aldehyde in presence of thiourea.

4. A composition of matter prepared by condensing the sulphonic acids of a phenol with formaldehyde in presence of thiourea.

5. A composition of matter prepared by condensing phenol sulphonic acid with formaldehyde in presence of thiourea.

6. A composition of matter prepared by condensing the sulphonation product of 4.4' dihydroxydiphenyldimethylmethane with formaldehyde in presence of thiourea.

7. A composition of matter prepared by condensing phenol sulphonic acid with formaldehyde in presence of thiourea where the reactants have the molecular ratio: for 1 of phenol, not more than 1.0 formaldehyde, not more than 0.2 thiourea.

8. A composition of matter prepared by condensing the sulphonation product of 4.4' dihydroxydiphenyldimethylmethane with formaldehyde in presence of thiourea where the reactants have the molecular ratio: for 1 of 4.4' dihydroxydiphenyldimethylmethane, not more than 1.0 formaldehyde, not more than 0.4 thiourea.

9. A composition of matter which comprises the product obtained by condensing the sulphonic acid of a phenol with an aldehyde in the presence of thiourea, where the reactants have the molecular ratio: for 1 of the sulphonic acid not more than 1 aldehyde, not more than 0.4 thiourea.

10. A composition of matter as described in claim 9 in which formaldehyde is the aldehyde which enters into the composition.

IAN C. SOMERVILLE.
HARRY R. RATERINK.